US007630431B2

(12) United States Patent
Konz et al.

(10) Patent No.: US 7,630,431 B2
(45) Date of Patent: Dec. 8, 2009

(54) ROBUST MESSAGE DECODER FOR SERIAL BUS APPLICATIONS

(75) Inventors: Daniel W. Konz, Florissant, MO (US); Philip J. Ellerbrock, Cottleville, MO (US)

(73) Assignee: The Boeing Company, Chicago, IL (US)

( * ) Notice: Subject to any disclaimer, the term of this patent is extended or adjusted under 35 U.S.C. 154(b) by 528 days.

(21) Appl. No.: 11/140,439

(22) Filed: May 27, 2005

(65) Prior Publication Data
US 2006/0268999 A1     Nov. 30, 2006

(51) Int. Cl.
H04B 1/38 (2006.01)
H04B 14/04 (2006.01)
H04L 5/16 (2006.01)

(52) U.S. Cl. .................. 375/219; 375/220; 375/242; 455/73

(58) Field of Classification Search .................. 375/242, 375/219; 455/73
See application file for complete search history.

(56) References Cited

U.S. PATENT DOCUMENTS

| | | | | |
|---|---|---|---|---|
| 4,199,663 | A * | 4/1980 | Herzog | 370/445 |
| 4,730,188 | A * | 3/1988 | Milheiser | 340/825 |
| 6,980,500 | B2 | 12/2005 | Lu et al. | |
| 7,012,935 | B2 | 3/2006 | Woelk et al. | |
| 2003/0214975 | A1 * | 11/2003 | Woelk et al. | 370/503 |
| 2005/0069041 | A1 | 3/2005 | Lincoln | |
| 2006/0002489 | A1 | 1/2006 | Zuhdi et al. | |
| 2006/0198270 | A1 * | 9/2006 | Lin et al. | 369/59.25 |

OTHER PUBLICATIONS

U.S. Appl. No. 10/842,326, filed May 10, 2004, Daniel W. Konz.
Forster, Roger, "Manchester Encoding: Opposing Definitions Resolved," *Engineering Science and Education Journal*, Dec. 2000, pp. 278-280.
U.S. Official Action dated Jul. 12, 2007 in U.S. Appl. No. 10/842,326.
U.S. Official Action dated Aug. 19, 2008 in U.S. Appl. No. 10/842,326.
U.S. Official Action dated Dec. 4, 2008 in U.S. Appl. No. 10/842,326.
U.S. Official Action dated Mar. 31, 2009 in U.S. Appl. No. 10/842,326.

* cited by examiner

*Primary Examiner*—David C Payne
*Assistant Examiner*—Brian J Stevens
(74) *Attorney, Agent, or Firm*—Hope Baldauff Hartman, LLC

(57) ABSTRACT

A data message decoder for high-speed serial bus applications includes a sync pattern decoder that is operated in parallel and simultaneously with a message bit decoder. By operating the sync pattern decoder and the message bit decoder in parallel and simultaneously a true sync pattern following a valid looking sync pattern may be identified and the decoding of the bit message following the valid looking sync pattern may be aborted once the true sync pattern is detected. The data message decoder is robust and tolerant of bus anomalies that are typical when using high frequency signaling on a multipoint serial bus. The robust data message decoder is suitable for, but not limited to, applications in the aerospace industry, such as onboard network systems for advanced commercial and military aircraft.

22 Claims, 3 Drawing Sheets

US 7,630,431 B2

ROBUST MESSAGE DECODER FOR SERIAL BUS APPLICATIONS

CROSS REFERENCE TO RELATED APPLICATIONS

The present application is related to the following co-pending U.S. patent application: "Data Message Sync Pattern", Ser. No. 10/842,326, filed May 10, 2004.

REFERENCE TO THE APPENDIX

The present application includes a VHDL (Very High Speed Integrated Circuits Hardware Description Language) source code appendix being incorporated by reference herein. Included are two identical compact discs labeled "Copy 1" and "Copy 2". The name of the file is "ib_rcvr.vhd"; the date of creation of the file was Jun. 14, 2004; the size of the file is 29 kb (kilobytes).

BACKGROUND OF THE INVENTION

The present invention generally relates to the implementation of multipoint buses and, more particularly, to a robust message decoder for serial bus applications and a method for decoding a message during high-speed communication.

The implementation of multipoint serial buses is very common in current communication technologies. A multipoint bus, which is a shared bus that includes multiple drivers, at least one receiver, and two terminations, is typically implemented as either a single-ended technology or as a differential signaling technology. However, high-speed versions of multipoint serial buses that include many nodes are not common due to a multitude of technical challenges. These technical challenges are associated mainly with physical layer impedance characteristics from cabling, connectors, transceivers, and terminators.

IntelliBus™ technology, a communication protocol physical layer implementation, was developed by The Boeing Company, Illinois, U.S.A., to provide higher performance yet simpler, lighter, more functional and affordable on-board network systems for advanced military aircraft. The IntelliBus™ communication technology uses, for example, a high-speed differential data bus physical layer for some of its applications. Differential signaling on the data bus usually means that each wire on the bus is switched between a low voltage potential and a high voltage potential above zero with respect to a common mode ground. The potentials on each wire are typically 180 degrees out of phase with each other. For example, line A may be 3 volts while line B may be 1 volt to indicate a logic 1 and line A may be 1 volt and line B may be 3 volts to indicate a logic 0. Differentially, these signals will be centered around 0 volts with the voltage between the two lines A and B being a positive voltage for one state and a negative voltage for the other state. In multipoint, tri-stating differential bus systems, the characteristics of high-speed signaling begin to become "non-ideal" due to factors such as impedance mismatches, capacitive bunching, line resistance, and transceiver impedances. External sources can also produce small amounts of differential noise that can be slightly greater than the built-in hysteresis of the receivers. These non-ideal conditions can create a variety of issues that must be considered when receiving signals from other devices on the bus.

Typical methods used to improve bus performance may include, for example, introducing a weak differential voltage bias to the bus. The bias may be added between the two signal lines, which may keep the receivers out of the hysteresis range and in a particular logic state. Data messages sent on the bus override the weak bias and drive the bus as necessary to produce the signals required to create the message. On a command-response type of bus, only one device can drive the bus at a time. When the driving device completes its message, the driver turns off. The weak bias is then in control until another device drives the bus. The weak bias will draw the bus voltage to the potential of the bias. When a device stops driving the bus, the bus will be tristated with a weak bias. The weak bias does not drive the bus as hard as a transmitting device. Depending on the bus construction (length, number of nodes, etc.) the differential voltage on the bus will taper off from the driven state to the bias voltage potential much slower than the driven state changes. In addition, the release of the driven state typically causes some ringing to occur. The frequency and duration of the ringing and the duration of time to get to the bias state depends on many characteristics, such as bus length, bus capacitance and resistance. This ringing can usually not be avoided. Generally, adding a bias cannot keep random data patterns from being received by a message decoder and from activating the message decoder when the bus is in a tristate (undriven) condition. Furthermore, specifying a maximum stub length, which is the distance of a wiretap from the device to the main bus line, usually minimizes the ringing of driven signals on the bus. Specifying minimum distances between devices can minimize capacitive bunching that may round off the square edges of a signal. Still further, high quality cable that has a well maintained characteristic impedance might generally promote good signal quality.

While these safeguards are important, they cannot guarantee that a properly formatted signal will be received. Certain signal anomalies—such as rise and/or fall time degradation, amplitude degradation, and some bus ringing—must be expected on a bus. These signal anomalies need to be ignored by the message decoder receiver if the maximum possible performance is to be extracted from a differential multi-point signal bus.

As can be seen, there is a need for a message decoder that enables the identification of true bit messages at high bit message rates. Furthermore, there is a need for a message decoder that tolerates bus anomalies, such as ringing, on high-speed multipoint serial busses since bus anomalies cannot be avoided. Still further, there is a need for a method for decoding messages during high-speed communication on a multipoint serial bus that tolerates bus anomalies without causing problems.

There has, therefore, arisen a need to provide a robust message decoder that reliably detects true bit messages during high-speed communication on a multipoint serial bus. There has further arisen a need to provide a simple low-cost method for decoding messages that tolerates bus anomalies during high-speed communication.

SUMMARY OF THE INVENTION

In one aspect of the present invention, a data message decoder for high-speed serial bus applications includes a sync pattern decoder and a message bit decoder. The message bit decoder is operated in parallel and simultaneously with the sync pattern decoder.

In another aspect of the present invention, a multipoint serial bus includes a plurality of transceivers, each of the transceivers including a data message decoder. The data message decoder includes a sync pattern decoder and a message bit decoder. The message bit decoder is operated in parallel and simultaneously with the sync pattern decoder.

In a further aspect of the present invention, a method for decoding a message during high-speed communication on a multipoint serial bus, comprises the step of: operating a sync pattern decoder in parallel and simultaneously with a message bit decoder.

These and other features, aspects and advantages of the present invention will become better understood with reference to the following drawings, description and claims.

DETAILED DESCRIPTION OF THE INVENTION

Figure 1:
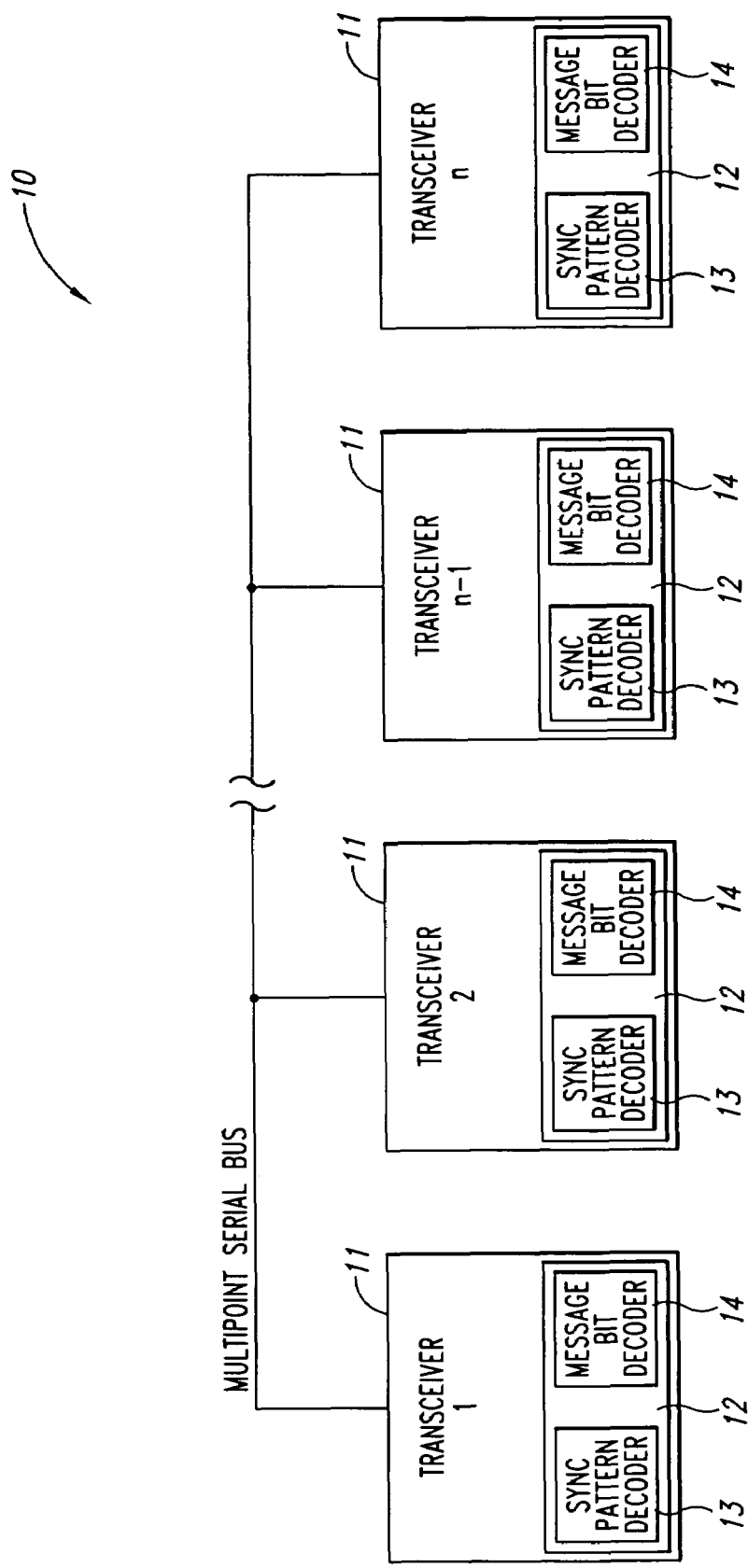
FIG. 1 is a block diagram of a multipoint serial bus according to one embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides a robust message decoder for high-speed multi-point serial bus applications. The present invention provides further a method for decoding a message for high bit-rate communication that tolerates anomalies on a bus. One embodiment of the present invention provides a robust message decoder that is suitable for, but not limited to, applications in the aerospace industry, such as onboard network systems for advanced commercial and military aircraft. The robust message decoder as in one embodiment of the present invention may be used, for example, with the IntelliBus™ technology developed by The Boeing Company, Illinois, U.S.A. The robust message decoder as in one embodiment of the present invention may further be used with any communication protocol that uses simple base-band physical layers for high bit-rate communication.

In one embodiment, the present invention provides a data message decoder that includes a sync pattern decoder and a message bit decoder to decode messages including a sync pattern followed by a bit message on a multipoint serial bus. By providing a separate sync pattern decoder and a separate message bit decoder that work simultaneously, signal anomalies on the bus, such as ringing, can be tolerated without causing problems during high bit-rate communication, which is not possible using a prior art message decoder that does not operate a sync pattern decoder in parallel with a message bit decoder. By providing a separate sync pattern decoder and a separate message bit decoder, the data message decoder as in one embodiment of the present invention may be used with standard wiring and standard base-band signaling for high bit-rate communications. Consequently, a simple low-cost solution is provided that enables speeding up communication protocols compared to prior art communication protocols that use only one message decoder that decodes a sync pattern as well as a bit message and, therefore, are limited to lower speed implementations. Using the sync pattern decoder and the message bit decoder simultaneously may make the data message decoder as in one embodiment of the present invention more robust compared to prior art message decoders that use only one message decoder that decodes a sync pattern as well as a bit message.

In one embodiment, the present invention provides a method for decoding messages during high-speed communication on a multipoint serial bus. By operating the sync pattern decoder continuously and the message bit decoder in parallel and simultaneously as in one embodiment of the present invention, false messages may be identified and the decoding of these false messages may be aborted once a true message is detected. This is not possible using prior art message decoders, since a prior art message decoder may only look for a new incoming message when the decoder is not busy decoding. When a false message is followed by a true message within a short time frame, prior art decoding methods may not detect the true message since the prior art message decoder may still be decoding the false message. Only after the prior art decoder realizes the message it was trying to decode was a false message, caused, for example, by signal ringing, will the prior art decoder look for new messages. Contrary to prior art message decoding methods, the method for decoding messages as in one embodiment of the present invention may include the steps of looking for a properly formatted sync pattern with the sync pattern decoder, providing a first detected message to the message bit decoder for decoding, and looking for a new properly formatted sync pattern with the sync pattern decoder while the message bit decoder decodes the first message. When the sync pattern decoder detects a new properly formatted sync pattern at any time, it may force the message bit decoder to abort decoding the first message and to start decoding the new message. Consequently, by using the method for decoding messages as in one embodiment of the present invention, true messages that follow shortly after a false message caused, for example, by signal noise or ringing, can be detected and decoded and, therefore, bus signal anomalies can be tolerated without causing problems. Since all true messages can be detected and decoded using the data message decoder as in one embodiment of the present invention while signal anomalies on the bus are tolerated, the data message decoder is more robust than a prior art message decoder that can either decode a message or look for a new message. Furthermore, the method for decoding messages as in one embodiment of the present invention enables high speed implementations of a communication protocol by having the sync decoder always running and looking for new properly formatted sync patterns while the message bit decoder is decoding messages. Prior art message decoding processes are mainly limited to lower speed implementation due to using only one message decoder that is not able to look for new sync patterns and to decode a message at the same time and, thus, not able to tolerate significant signal anomalies.

Referring now to FIG. 1, a multipoint serial bus 10 is illustrated according to one embodiment of the present invention. The multipoint serial bus 10 may include a plurality n of transceivers 11. Each of the n transceivers may include a data message decoder 12. Each data message decoder may include a sync pattern decoder 13 and a message bit decoder 14. The multipoint serial bus 10 may utilize Manchester (Bi-Phase) type signal encoding with a preceding embedded sync pattern as described in the application "Data Message Sync Pattern", Ser. No. 10/842,326, filed May 10, 2004. The transceivers 11 may receive and transmit data over the Manchester-type signal encoded multipoint serial bus 10. The message format may be, for example, a sync pattern 21 (shown in FIG. 2) plus a Manchester encoded bit message, such as a 18-bit word, as used, for example, in the IntelliBus™ protocol developed by The Boeing Company, Illinois, U.S.A. The sync pattern 21 (FIG. 2) may be used to identify the beginning of each bit message, and furthermore, the sync pattern 21 may identify that bit message as either a command or data message. The sync pattern decoder 13 may be constantly searching for a sync pattern 21. If the sync pattern decoder 13 detects a sync pattern 21, it may activate the message bit decoder 14 to decode the bit message following the detected sync pattern 21. The message bit decoder 14 may be, for example, a typical bi-phase Manchester decoder.

Figure 2:
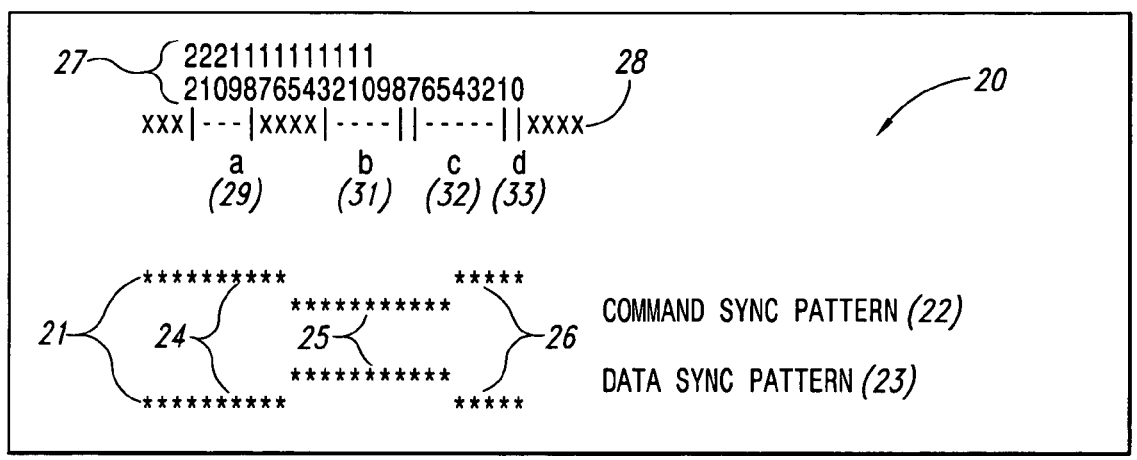
FIG. 2 is a diagram for detecting a sync pattern according to one embodiment of the present invention.

Referring now to FIG. 2, a diagram 20 for detecting a sync pattern 21 is illustrated according to one embodiment of the present invention. The sync pattern 21 may be represented in many forms but in essence is a significantly different pattern than the typical Manchester type signals used in the bit decoder 14. The sync pattern 21 may be a command sync pattern 22 that may include a first region 24 where the received signal may go high (to a logic 1) for 1 bit period, followed by a second region 25 where the received signal may go low (to a logic 0) for 1½ bit periods, followed by a third region 26 where the received signal may go high (to a logic 1) for ½ bit period. The sync pattern 21 may further be a data sync pattern 23 that may include a first region 24 where the received signal may go low (to a logic 0) for 1 bit period, followed by a second region 25 where the received signal may go high (to a logic 1) for 1½ bit periods, followed by a third region 26 where the received signal may go low (to a logic 0) for ½ bit period. The sync pattern decoder 13 may use an internal serial shift register 27 that continuously shifts samples 28 of the signal from the multipoint serial bus 10 into the sync pattern decoder 13. Since the transceiver 11 may be asynchronous, the sampling may occur at a rate higher than the bit rate of the bus 10.

The diagram 20 (as illustrated in FIG. 2) shows the detection of the sync pattern 21 with the sync pattern decoder 13. First, the sync pattern decoder 13 may look for a state pattern in sequence, for example, for a first state "a" (29), followed by the second state "b" (31), followed by the third state "c" (32), and may set flags indicating that a possible state "a" (29), "b" (31), or "c" (32) exists for a command sync pattern 22 or a data sync pattern 23. Finally, the sync pattern decoder 13 may check if the state pattern has a positive identification on all three states "a" (29), "b" (31), and "c" (32) sequentially for a command sync pattern 22 or a data sync pattern 23 and also may check for a final edge "d" (33) following the third state "c" (32). As illustrated in FIG. 2, the first state "a" (29) may be located within the first region 24 of the sync pattern 21, the second state "b" (31) and the third state "c" (32) may be located within the second region 25 of the sync pattern 21, and the final edge "d" (33) is located at the transition from the second region 25 to the third region 26 of the sync pattern 21. The final edge 33 may be a rising edge in case the detected sync pattern 21 is a command sync pattern 22 or may be a falling edge if the detected sync pattern is a data sync pattern 23. If all checks are true and the states "a" (29), "b" (31) and "c" (32) were detected in this order followed by a final edge "d" (33), a sync pattern detect command for the proper type of the detected sync pattern 21, either for the command sync pattern 22 or the data sync pattern 23, will be sent momentarily to activate the message bit decoder 14 and the message bit decoder 14 will start decoding the bit message following the sync pattern 21.

The internal shift register 27 may continuously shift samples 28 of the incoming signal into the sync pattern decoder 13. The internal shift register 27 may start at a register location 22 and may drop down from there to the register location 0, as shown in FIG. 2. The samples 28 may be taken, for example, at the register locations 22 to 18 to check for the first state "a" (29) within the first region 24 of the sync pattern 21. No sample might be taken at the transition from the first region 24 to the second region 25 of the sync pattern, as indicated by the "x" in FIG. 2. Excluding this area from sampling may mask out noise on the bus that may occur during the transition. Further samples 28 may be taken, for example, at the register locations 13 to 8 to check for the second state "b" (31) within the second region 25 of the sync pattern 21. Still further samples 28 may be taken, for example, at the register locations 7 to 1 to check for the third state "c" (32) within the second region 25 of the sync pattern 21. Finally, a sample may be taken at the register location 0 to check for a final edge transition 33. If a final edge 33 follows the states "a" (29), "b" (31) and "c" (32), a true sync pattern 21 was detected and the message bit receiver 14 may be activated to start decoding the bit message that follows the sync pattern.

Usually, the message bit decoder 14 may decode the proper number of message bits and may end the message decoding process successfully. When an out of sequence state or a non state is detected, the sync pattern decoder 13 may detect the error and may start looking for another signal carrying a valid sync pattern 21 while the message bit decoder 14 may continue to operate until it detects the error or until another sync pattern 21 is detected by the sync pattern decoder 13 and provided to the message bit decoder 14. The sync pattern decoder 13 may be always looking for a pattern in sequence, for example, the states "a" (29), "b" (31) and "c" (32) followed by a final edge "d" (33) (as shown in FIG. 2). Some anomalies on the bus 10 may set only one or two of the state flags positive but not all four required (29, 31, 32, and 33) for a valid sync pattern 21 and such anomalies might be easily detected by the sync pattern decoder 13. However, while using high-frequency signaling on a multipoint serial bus 10, an improper sync pattern 21 that appears to be valid may occur due to bus anomalies, such as reclocking Manchester bi-phase signaling, bit stuffing, a bad parity or a cyclic redundancy check error (CRC). Therefore, the sync pattern decoder 13 may start checking for signals with a new valid sync pattern 21 immediately after a valid sync pattern is detected while simultaneously activating the message bit decoder 14 thus restarting the message bit decoder 14 if it was previously decoding the bit message. If a new valid sync pattern 21 is detected by the sync pattern decoder 13 while the message bit decoder 14 is still decoding the previous bit message that may be invalid, the sync pattern decoder 13 may restart the message bit decoder 14 to start decoding the bit message following the newly detected sync pattern 21. Consequently, the data message decoder 12 that may include the sync pattern decoder 13 operating in parallel and simultaneously with the message bit decoder 14, may be tolerant of bus anomalies that are typical when using high-frequency signaling on a multipoint serial bus 10.

Figure 3:
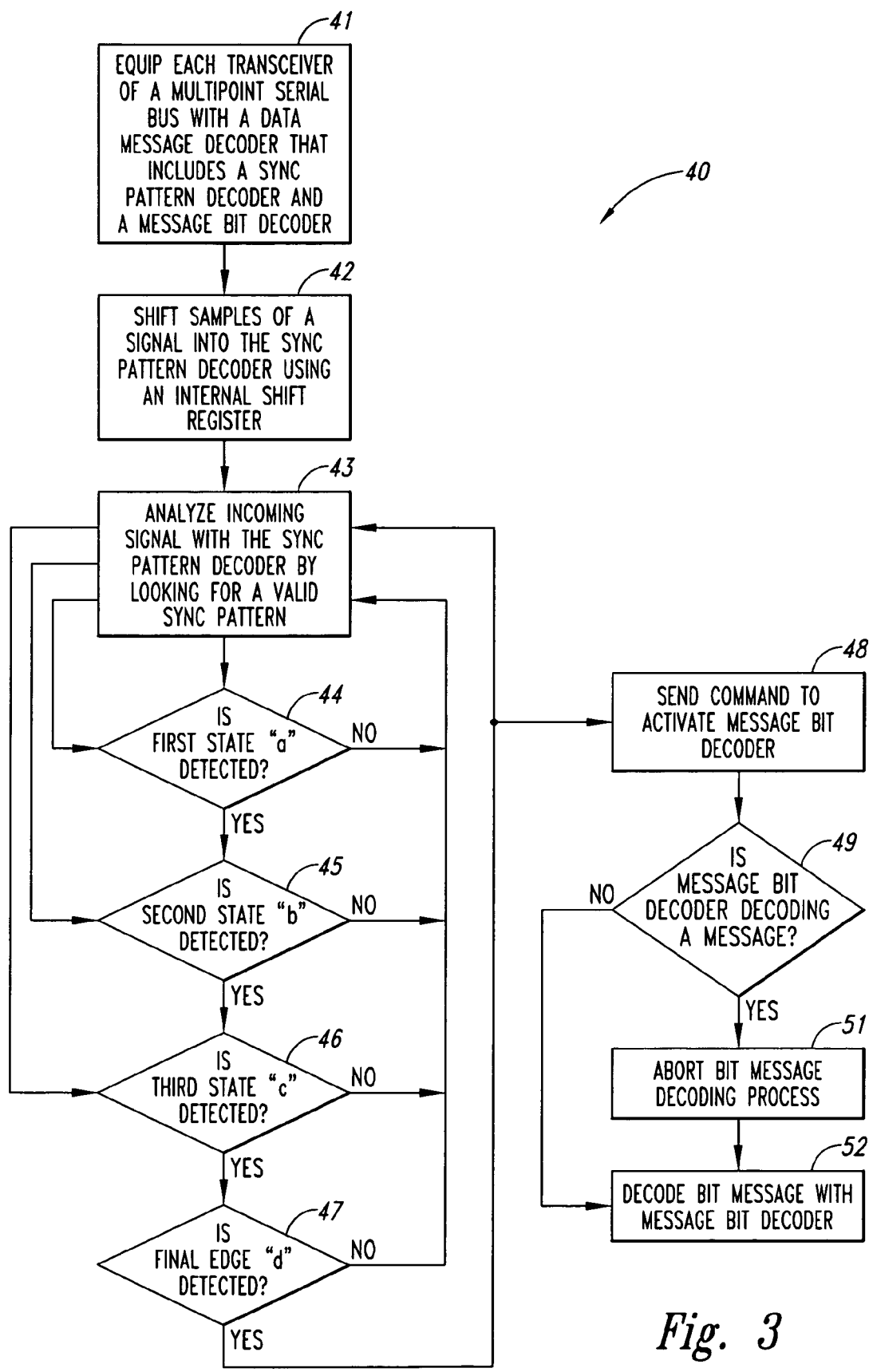
FIG. 3 is a flow chart of a method for decoding a message during high-speed communication according to one embodiment of the present invention.

Referring now to FIG. 3, a method 40 for decoding a message during high-speed communication on a multipoint serial bus 10 is illustrated according to one embodiment of the present invention. In step 41, each transceiver 11 of the multipoint serial bus 10 may be equipped with a data message decoder 12 that may include a sync pattern decoder 13 that may be operated in parallel and simultaneously with a message bit decoder 14 (as shown in FIG. 1). An internal shift register 27 may continuously shift samples 28 of the signal received into the sync pattern decoder 13 (step 42). The sync pattern decoder 13 may then start analyzing the incoming samples 28 of the signal in step 43 by looking for a valid sync pattern, which may be a state pattern in sequence, for example, the states "a" (29), "b" (31) and "c" (32) followed by a final edge "d" (33) (as shown in FIG. 2). In step 44, the sync pattern decoder 13 may look for the first state "a" (29) that may be located within a first region 24 of a sync pattern 21. If the first state "a" (29) is detected, then a flag may be set indicating a possible state "a" (29) (as shown in FIG. 2). In step 45, the sync pattern decoder 13 may look for the second state "b" (31) that may be located within a second region 25 of a sync pattern 21 (as shown in FIG. 2). If the second state "b" (31) is detected, then a flag may be set indicating a possible state "b" (31). In step 46, the sync pattern decoder 13 may look for the third state "c" (32) that may be located within a second region 25 of a sync pattern 21 (as shown in FIG. 2). If the third state "c" (32) is detected, then a flag may be set indicating a possible state "c" (32). In step 47, the sync pattern decoder 13 may look for the existence of all three states "a" (29), "b" (31), and "c" (32) and the final edge "d" 33. If all three states "a" (29), "b" (31), and "c" (32) in sequence and the final edge "d" 33 were detected by the sync pattern decoder 13, then the sync pattern decoder 13 may activate the message bit decoder 14 in step 48. The method 40 used in connection with the sync pattern decoder 13 permits the detection of possible new sync patterns 21 beyond final edge "d" 33 transition since the first possible new "a" state 29 can only occur after the final edge "d" 33. Therefore, a properly formatted sync signal can never be missed even while the message bit decoder 14 is attempting to decode a properly formatted message. Immediately after activating the message bit decoder 14 in step 38, the sync pattern decoder 13 may restart analyzing the incoming signal in step 43. When the message bit decoder 14 is activated, it may be determined in step 49 if the message bit decoder 14 is already decoding a message. If the message bit decoder 14 is already decoding a bit message, the message bit decoder 14 will abort the decoding process in step 51 and will start to decode the bit message following newly detected sync pattern 21 that is likely to be valid. If the message decoder 14 is not already decoding a bit message, it will start immediately decoding the bit messages following the detected sync pattern.

It should be understood, of course, that the foregoing relates to exemplary embodiments of the invention and that modifications may be made without departing from the spirit and scope of the invention as set forth in the following claims.

We claim:

1. A data message decoder for high-speed serial bus applications, comprising:
   a sync pattern decoder adapted to find a first valid sync pattern in a first data message; and
   a message bit decoder adapted to decode a first bit message following said first valid sync pattern in said first data message upon said sync pattern decoder finding said first valid sync pattern in said first data message, wherein said message bit decoder is operated in parallel with said sync pattern decoder, said sync pattern decoder looking for a second valid sync pattern in a second data message while said message bit decoder decodes said first bit message in said first data message;
   wherein said sync pattern decoder detects said second valid sync pattern in said first data message, said message bit decoder aborts decoding said first bit message, and upon said message bit decoder aborting decoding said first bit message, said message bit decoder starts decoding a second bit message in said second data message following said detected second sync pattern.

2. The data message decoder of claim 1, wherein said sync pattern decoder and said message bit decoder are integrated within a transceiver, wherein said serial bus includes a plurality of said transceivers, and wherein said transceiver is asynchronous.

3. The data message decoder of claim 1, wherein said serial bus utilizes Manchester (bi-phase) type signal encoding with an embedded sync pattern followed by a bit message.

4. The data message decoder of claim 1, wherein said sync pattern decoder uses an internal register to shift samples of a signal from said serial bus into said sync pattern decoder.

5. The data message decoder of claim 4, wherein said sync pattern decoder analyzes said samples of said signal, and wherein said sync pattern decoder looks for a valid sync pattern that is characterized by a state pattern in sequence.

6. The data message decoder of claim 5, wherein said sync pattern decoder looks for a first state, followed by a second state, followed by a third state, in sequence, and for a final edge following said third state.

7. The data message decoder of claim 1, wherein said sync pattern decoder transmits an activation command to initiate said message bit decoder upon said sync pattern decoder finding said first valid sync pattern in said first data message.

8. A multipoint serial bus, comprising:
   a plurality of transceivers, at least one of said transceivers including a data message decoder, wherein:
   said data message decoder includes a sync pattern decoder adapted to find a first valid sync pattern in a first data message and a message bit decoder adapted to decode a first bit message following said first valid sync pattern in said first data message upon said sync pattern decoder finding said first valid sync pattern in said first data message and subsequently transmitting an activation command to initiate said message bit decoder, and
   said message bit decoder is operated in parallel with said sync decoder, said sync pattern decoder looking for a second valid sync pattern in a second data message while said message bit decoder decodes said first bit message in said first data message;
   wherein said sync pattern decoder detects said second valid sync pattern in said first data message, said message bit decoder aborts decoding said first bit message, and upon said message bit decoder aborting decoding said first bit message, said message bit decoder starts decoding a second bit message in said second data message following said detected second sync pattern.

9. The multipoint serial bus of claim 8, wherein each of said transceiver receives signals that are Manchester (bi-phase) encoded and include a preceding embedded sync pattern.

10. The multipoint serial bus of claim 9, wherein:
    said sync pattern is a command sync pattern, and
    said command sync pattern includes a first region having a logic 1 for 1 bit period, followed by a second period having a logic 0 for 1½ bit period, followed by a third region having a logic 1 for 1½ bit period.

11. The multipoint serial bus of claim 9, wherein:
    said sync pattern is a data sync pattern, and
    said data sync pattern includes a first region having a logic 0 for 1 bit period, followed by a second period having a logic 1 for 1½ bit period, followed by a third region having a logic 0 for ½ bit period.

12. The multipoint serial bus of claim 11, wherein said sync pattern decoder uses an internal shift register to continuously shift samples of said signal into said sync pattern decoder, wherein said samples are taken from said first region, from said second region, and at the transition from said second region to said third region.

13. The multipoint serial bus of claim 11, wherein said sync pattern decoder looks for a state pattern having a first state within said first region, followed by a second state within said second region, followed by a third state within said second region, in sequence, and for a final edge following said third state at the transition from said second region to said third region.

14. The multipoint serial bus of claim 13, wherein said final edge is a rising edge indicating a valid command sync pattern.

15. The multipoint serial bus of claim 13, wherein said final edge is a falling edge indicating a valid data sync pattern.

16. A method for decoding a message during high-speed communication on a multipoint serial bus, comprises the step of:
operating a sync pattern decoder adapted to find a first valid sync pattern in a first data message in parallel with a message bit decoder adapted to decode a first bit message following said first valid sync pattern in said data message upon said sync pattern decoder finding said first valid sync pattern in said first data message, said sync pattern decoder looking for a second valid sync pattern in a second data message while said message bit decoder decodes said first bit message in said first data message;
equipping at least one transceiver of said multipoint serial bus with a data message decoder that includes said sync pattern decoder and said message bit decoder;
continuously shifting samples of an incoming signal into said sync pattern decoder with an internal shift register;
analyzing said incoming samples with said sync pattern decoder;
looking for a valid sync pattern in said incoming samples with said sync pattern decoder;
detecting said first valid sync pattern;
upon detecting said first valid sync pattern, activating said message bit decoder to decode a first bit message following said first valid sync pattern with said message bit decoder;
restarting analyzing said incoming samples of said signal with said sync pattern decoder;
in parallel with decoding said first bit message, detecting said second valid sync pattern;
upon detecting said second valid sync pattern, aborting decoding said first bit message with said message bit decoder;
restarting analyzing said incoming samples of said signal with said sync pattern decoder; and
upon aborting decoding said first bit message, activating said message decoder to decode a second bit message following said second valid sync pattern with said message bit decoder.

17. The method for decoding a message during high-speed communication on a multipoint serial bus of claim 16, further comprising the step of looking for a state pattern in sequence followed by a final edge with said sync pattern decoder.

18. The method for decoding a message during high-speed communication on a multipoint serial bus of claim 16, further comprising the steps of:
receiving signals with said transceivers that are Manchester (bi-phase) encoded; and
embedding a command sync pattern into said signals that includes a includes a first region having a logic 1 for 1 bit period, followed by a second period having a logic 0 for 1½ bit period, followed by a third region having a logic 1 for ½ bit period.

19. The method for decoding a message during high-speed communication on a multipoint serial bus of claim 16, further comprising the steps of:
receiving signals with said transceivers that are Manchester (bi-phase) encoded; and
embedding a data sync pattern into said signals that include a first region having a logic 0 for 1 bit period, followed by a second period having a logic 1 for 1½ bit period, followed by a third region having a logic 0 for ½ bit period.

20. The method for decoding a message during high-speed communication on a multipoint serial bus of claim 19, further comprising the steps of:
looking with said sync pattern decoder for a first state within said first region of said sync pattern;
detecting said first state within said first region of said sync pattern;
setting a flag indicating a possible first state;
looking with said sync pattern decoder for a second state within said second region of said sync pattern;
detecting said second state within said second region of said sync pattern;
setting a flag indicating a second state;
looking with said sync pattern decoder for a third state within said second region of said sync pattern;
detecting said third state within said second region of said sync pattern;
setting a flag indicating a possible third state;
checking for existence of said first state, said second state and said third state in sequence; and
looking with said sync pattern decoder for a final edge following said third state at the transition from said second region to said third region of said sync pattern; and
detecting said final edge.

21. The method for decoding a message during high-speed communication on a multipoint serial bus of claim 19, further comprising the steps of:
detecting a rising final edge; and
identifying said sync pattern as said command sync pattern.

22. The method for decoding a message during high-speed communication on a multipoint serial bus of claim 19, further comprising the steps of:
detecting a falling final edge;
identifying said sync pattern as said data sync pattern; and
immediately restarting the detection of a new sync pattern.

* * * * *